US012730025B2

(12) United States Patent
Verrette et al.

(10) Patent No.: US 12,730,025 B2
(45) Date of Patent: Sep. 8, 2026

(54) MICROFLUIDIC PARTITION LEAKAGE DETECTION METHODS AND SYSTEMS

(71) Applicant: Roche Molecular Systems, Inc., Pleasanton, CA (US)

(72) Inventors: Jean Verrette, Zurich (CH); Lars Schmohl, Ballwil (CH); Megan Gonzales, Livermore, CA (US)

(73) Assignee: Roche Molecular Systems, Inc., Pleasanton, CA (US)

( * ) Notice: Subject to any disclaimer, the term of this patent is extended or adjusted under 35 U.S.C. 154(b) by 301 days.

(21) Appl. No.: 18/235,261

(22) Filed: Aug. 17, 2023

(65) Prior Publication Data

US 2024/0060845 A1 Feb. 22, 2024

Related U.S. Application Data

(60) Provisional application No. 63/399,039, filed on Aug. 18, 2022.

(51) Int. Cl.
*G01M 3/00* (2006.01)
*G06N 5/01* (2023.01)

(52) U.S. Cl.
CPC ................ *G01M 3/00* (2013.01); *G06N 5/01* (2023.01)

(58) Field of Classification Search
CPC .......... G06N 20/10; G06N 20/20; G06N 5/01; G01M 3/00; G01M 3/38
USPC ........................................................... 702/51
See application file for complete search history.

(56) References Cited

U.S. PATENT DOCUMENTS

| | | | | |
|---|---|---|---|---|
| 2007/0010951 | A1 | 1/2007 | Woo et al. | |
| 2019/0384963 | A1 | 12/2019 | Kim et al. | |
| 2020/0074303 | A1 | 3/2020 | Chu et al. | |
| 2020/0306753 | A1 | 10/2020 | Meier et al. | |
| 2022/0036538 | A1* | 2/2022 | Steiman | G06N 3/0464 |
| 2022/0062903 | A1 | 3/2022 | Sarofim | |

OTHER PUBLICATIONS

Extended European Search Report mailed Feb. 7, 2023 in EP Application 22191070.6, 9 pages.

* cited by examiner

*Primary Examiner* — John H Le
(74) *Attorney, Agent, or Firm* — Maneesh Gupta

(57) ABSTRACT

System and methods in this disclosure identify leakage from one partition to surrounding partitions. Detecting leakage may include input data describing the location of the partition, the fluorescence intensity, and whether the partition is positive for an analyte. A machine learning model may be trained on an extensive input data set to identify partitions that have leakage or a high probability of leakage. In some embodiments, features used in the machine learning model include values that describe a neighborhood around the partition and not merely the partition itself.

18 Claims, 8 Drawing Sheets

500

500

600

MICROFLUIDIC PARTITION LEAKAGE DETECTION METHODS AND SYSTEMS

CROSS-REFERENCE TO RELATED APPLICATION

The present application claims the benefit of priority to U.S. Provisional Patent Application No. 63/399,039, filed on Aug. 18, 2022, the entire contents of which are incorporated herein by reference for all purposes.

BACKGROUND

Digital polymerase chain reaction (digital PCR or dPCR) is a diagnostic technique. Digital PCR consumables include an array of partitions (i.e., wells). A sample including nucleic acid molecules (e.g., DNA, cDNA, or RNA) is distributed to the wells. The nucleic acid molecules in the wells are amplified and reacted with a detection agent/assay (e.g., a fluorescence label). The detection agent is detected or is not detected in the partition, and the partition is classified accordingly. Information about the types of nucleic acid molecules in the wells and the number of wells for each type can be used to analyze the sample and diagnose a subject from whom the sample is obtained.

A purpose of partitioning the sample is to obtain independent fluorescence measurements. A problem that arises when partitioning samples to perform dPCR is that the material from one partition may leak across the edges of one partition into another partition. The leakage may be the result of overfilling, underfilling, defects in the material defining the partition, or errors in handling. Underfilling or overfilling of the sample across the plate can result in an increase in wells with high fluorescence measurements from leakage. Leakage into additional partitions can result in overestimating the presence of the target, because measurement of additional partitions reveals elevated fluorescence values. Identifying partitions with leakage is desirable for improving diagnostic assays. These and other needs are addressed.

BRIEF SUMMARY

System and methods in this disclosure identify leakage from one partition to surrounding partitions. Detecting leakage may include input data describing the location of the partition, the fluorescence intensity, and whether the partition is positive for an analyte. A machine learning model may be trained on an extensive input data set to identify partitions that have leakage or a high probability of leakage. In some embodiments, features used in the machine learning model include values that describe a neighborhood around the partition and not merely the partition itself. The partitions with leakage may be hexagonal partitions on a plate for use in a digital PCR system.

Embodiments may include methods of detecting leakage in a microfluidic device. Methods may include receiving test input data. The test input data may include, for each partition of the test plurality of partitions, the properties obtained from pixels of one or more images of the microfluidic device. Properties may include a location of the partition within the microfluidic device, a value of an intensity of pixels associated with the partition, and a status of an analyte being absent or present in the partition. Methods may in addition include determining a classification of whether a first partition of the test plurality of partitions is characterized by leakage using a machine learning model. The machine learning model may use the test input data. The machine learning model may be trained by receiving training input data. The training input data may be obtained from pixels of images of a plurality of training microfluidic devices with each training microfluidic device having a first plurality of partitions. The training input data including for each partition, the same properties as the test input data and first labels indicating a known classification of whether a partition is characterized by leakage for each partition in the first plurality of partitions. Methods may also include optimizing, using the training input data, parameters of the machine learning model based on outputs of the machine learning model matching or not matching corresponding labels of the first labels when the machine learning model is executed using the training input data. An output of the machine learning model may specify whether a partition is characterized by leakage. Other embodiments of this aspect include corresponding computer systems, apparatus, and computer programs recorded on one or more computer storage devices, each configured to perform the actions of the methods.

Embodiments may include methods of training a machine learning model for detecting leakage in a microfluidic device. Methods may include receiving training input data. The training input data may be obtained from pixels of images of a plurality of training microfluidic devices. Each training microfluidic device may have a first plurality of partitions. The training input data may include for each partition, a location of the partition within each training microfluidic device, a value of an intensity of pixels associated with the partition, a status of an analyte being absent or present in the partition, and first labels indicating a known classification of whether a partition is characterized by leakage for each partition in the first plurality of partitions. Methods may in addition include optimizing, using the training input data, parameters of the machine learning model based on outputs of the machine learning model matching or not matching corresponding labels of the first labels when the machine learning model is executed using the training input data. An output of the machine learning model may specify whether a partition is characterized by leakage. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

A better understanding of the nature and advantages of embodiments of the present invention may be gained with reference to the following detailed description and the accompanying drawings.

DETAILED DESCRIPTION

Figure 1:
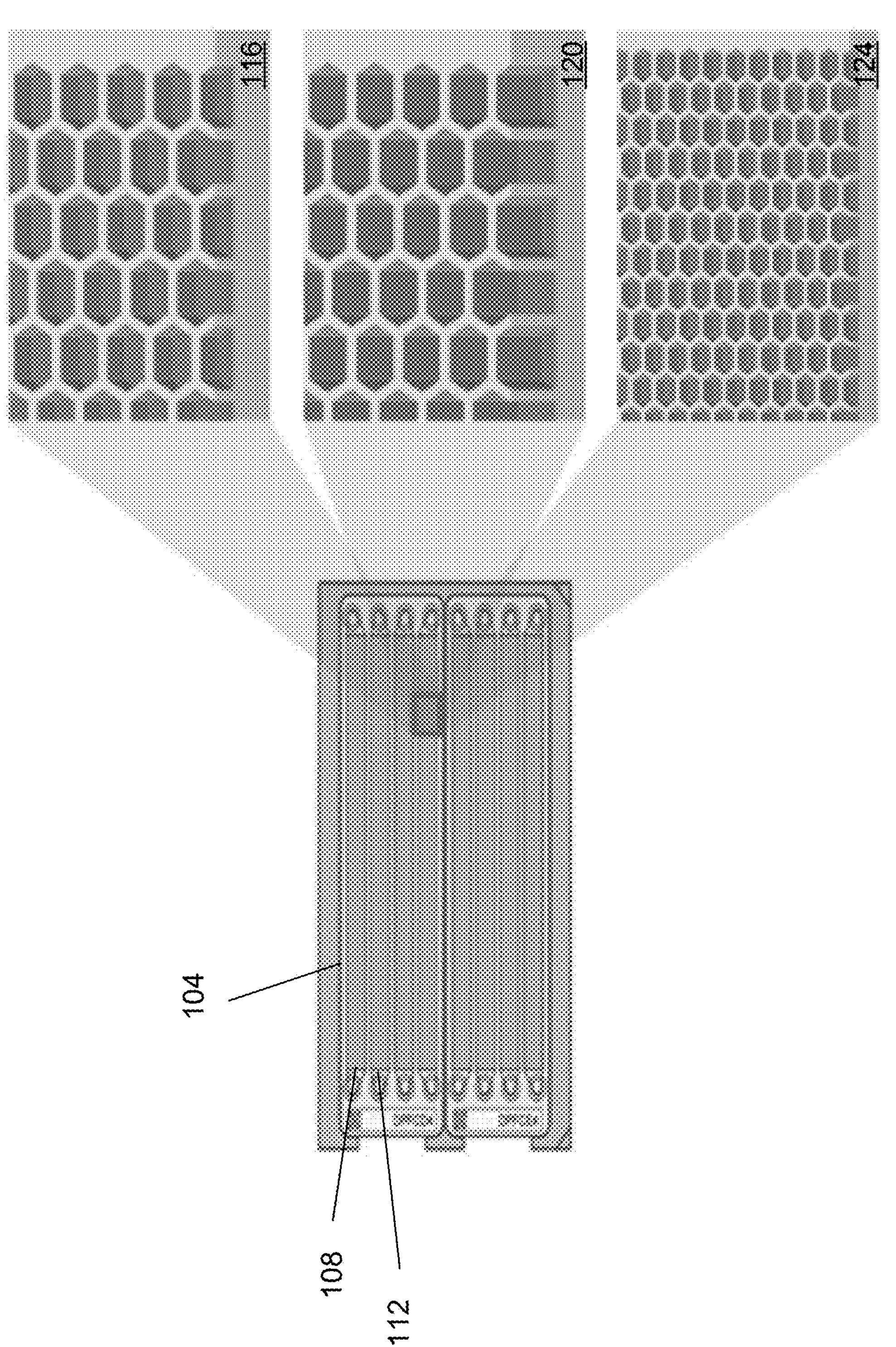
FIG. 1 shows an illustration of a well plate according to embodiments of the present invention.

Certain assays, such as those performed on digital PCR, detect and quantify analytes in an array of partitions. The number of partitions that are positive for a given analyte may affect analysis based on the assay sensitivity. Errors in the number of partitions called positive may affect the diagnosis of a medical disorder, such as cancer. Leakage may occur between partitions, which may cause some partitions to appear positive for an analyte even when they originally are not. Leakage may occur during PCR cycling steps. PCR cycling may include 40 cycles, but leakage may be more prevalent early in the cycles (e.g., first 10 cycles.) Current methods to identify leakage depend on a dPCR analyst to manually identify areas of leakage from an image. Such analysis may be slow and laborious. In addition, detection of leakage is subjective, and dPCR analysts may disagree on whether leakage is present. Additionally, such manual analysis may be limited to a particular lab or site or to only certain well plates rather than all or most well plates used.

The disclosure describes systems and methods for identifying leakage. The systems and methods use a trained machine learning model to identify leakage. The machine learning model is trained on a robust training data set. Features for the machine learning model include values that represent how a neighborhood of partitions compares to the population of partitions in a particular lane or well plate. Systems and methods described herein improve assay technology by allowing faster identification of leakage, avoiding repeated assays, increase accuracy, allow for smaller sample, and/or allow for identifying leakage in all or most well plates, without restriction to a particular site.

The partitions may be hexagonal in shape. Hexagon partitions have certain characteristics that may be advantageous for determining leakage. Exactly three hexagons meet at each vertex, and all three such hexagons are neighboring or share edges. In contrast, a square tiling would result in four squares meeting at each vertex, and pairs of diagonal squares share no edges. In the square example, leakage across edges cannot easily pass to all polygons sharing a vertex because leakage spreads across the edges of any tiled polygon. In the hexagonal example, each interior hexagon is surrounded by six neighboring hexagons of equal area. This results in a pattern of spread resembling a bullseye dissimilar from a square or triangular tiling. The adjoining polygons that the master mix fluid leaks into can be determined by the choice of tiling.

The term "classification" as used herein refers to any number(s) or other characters(s) that are associated with a particular property of a sample. For example, a "+" symbol (or the word "positive") could signify that a sample is classified as having deletions or amplifications. The classification can be binary (e.g., positive or negative) or have more levels of classification (e.g., a scale from 1 to 10 or 0 to 1).

The terms "cutoff" and "threshold" refer to predetermined numbers used in an operation. For example, a threshold can refer to an intensity value above which analytes are considered detected. A threshold value may be a value above or below which a particular classification applies. Either of these terms can be used in either of these contexts. A cutoff or threshold may be "a reference value" or derived from a reference value that is representative of a particular classification or discriminates between two or more classifications. Such a reference value can be determined in various ways, as will be appreciated by the skilled person. For example, metrics can be determined for two different cohorts of subjects with different known classifications, and a reference value can be selected as representative of one classification (e.g., a mean) or a value that is between two clusters of the metrics (e.g., chosen to obtain a desired sensitivity and specificity). As another example, a reference value can be determined based on statistical analyses or simulations of samples.

The term "machine learning models" may include models based on using sample data (e.g., training data) to make predictions on test data, and thus may include supervised learning. In some embodiments, machine learning models may include unsupervised or semi-supervised learning. Machine learning models often are developed using a computer or a processor. Machine learning models may include statistical models.

The term "about" or "approximately" can mean within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 20%, up to 10%, up to 5%, or up to 1% of a given value. Alternatively, particularly with respect to biological systems or processes, the term "about" or "approximately" can mean within an order of magnitude, within 5-fold, and more preferably within 2-fold, of a value. Where particular values are described in the application and claims, unless otherwise stated the term "about" meaning within an acceptable error range for the particular value should be assumed. The term "about" can have the meaning as commonly understood by one of ordinary skill in the art. The term "about" can refer to ±10%. The term "about" can refer to ±5%.

I. Example Assay System

An example of an assay system that may encounter leakage is a dPCR system. A dPCR system may use PCR with fluorescence detection. A biological sample containing nucleic acid molecules may be distributed into a well plate. These wells (i.e., partitions) may be the subject of leakage.

A. Plates

FIG. 1 shows an illustration of a plate 104. Plate 104 includes eight equal lanes (e.g., lane 108, lane 112). Each lane is equal in width and spans the length of plate 104. Each lane includes many partitions. The partitions may be of different sizes and densities among different plates. The partitions in a particular plate and in a lane are of the same size and a uniform density. For example, partition set 116 includes partitions each with a reaction volume of 30 μL. Plate 104 may include about 30,000 partitions of partition set 116. As another example, partition set 120 may include partitions each with a reaction volume of 40 μL. Plate 104 may include about 20,000 partitions of partition set 120. As yet another example, partition set 124 may include partitions each with a reaction volume of 10 μL. Well plate 104 may include about 100,000 partitions of partition set 124. Different plates with different sizes or numbers of partitions may be used for different applications, including gene expression, absolute quantitation, cell-free DNA, residual DNA testing, microbial detection, and copy number variation. The example partitions in FIG. 1 are hexagonal.

B. Procedure to Determine Positive Partitions

Partitions that are positive for a target analyte should fluoresce. An assay system may detect different types of fluorescence using different detection channels. For example, a system may include six detection channels, each channel for a different type of dye. Detection of a positive partition may include several steps. Some partitions may be invalidated, and intermediate results may be calculated. Such results from intermediate algorithms may be used as input to subsequent algorithms. At each stage, only valid partitions may be used to calculate subsequent algorithms.

A series of high-resolution images may be acquired across the horizontal dimension (e.g., a lane) of the plate during or after PCR amplification. The partitions of the plate may be organized into rows and columns in the image. Afterward, the image may undergo artifact removal, which may include removing partitions that may be contaminated by dust, hair, or other particulates. The resulting image may be segmented into the different partitions. The edges of the partitions may be identified and separated from the contents of the partitions. The different partitions may be assigned coordinates based on location. A corresponding integer fluorescence value may be assigned to each validly identified partition. This data set may include the fluorescence value of each valid partition along with the associated coordinates of the partition.

This data set may undergo a masking algorithm that invalidates a set of partitions regardless of raw fluorescence values of partitions and without any accompanying calculations or algorithm. The intention is to remove entire regions of the plate which sometimes result in poor signals. Crosstalk correction may adjust the fluorescence values across channels to mitigate interference stemming from simultaneous measurements across channels. Fluorescence values may also be normalized by the fluorescence value of a control channel.

The refined data after normalization can then be used to classify a partition as either positive or negative based on the fluorescence value for each color channel. Classifying the partition may be done by comparing the fluorescence value to a threshold. The threshold may be determined through operator judgment or through a computer system. The threshold may be based on a desired accuracy (e.g., specificity and/or sensitivity). In embodiments, the classification of the partitions may be performed by a computer system.

II. Example Leakage Detection

Leakage in partitions can be detected using sufficient training data and features describing the neighborhood of a partition. Digital PCR systems and other systems may be in the field for 10 years and may not have software updated during that time. As a result, a robust training set is desired to ensure an accurate technique to detect leakage. In addition, the technique to detect leakage should be applicable to a wide variety of samples and use cases that may be encountered by systems over their lifetime.

A. Features

Features used in techniques to determine leakage include values related to a neighborhood of a given partition. These features mimic a bull's eye pattern to identify leakage. Features may be calculated statistics on neighborhoods surrounding each interior hexagon. The statistics on such neighborhoods may be metrics measuring how much each neighborhood resembles a bull's eye.

Figure 2:
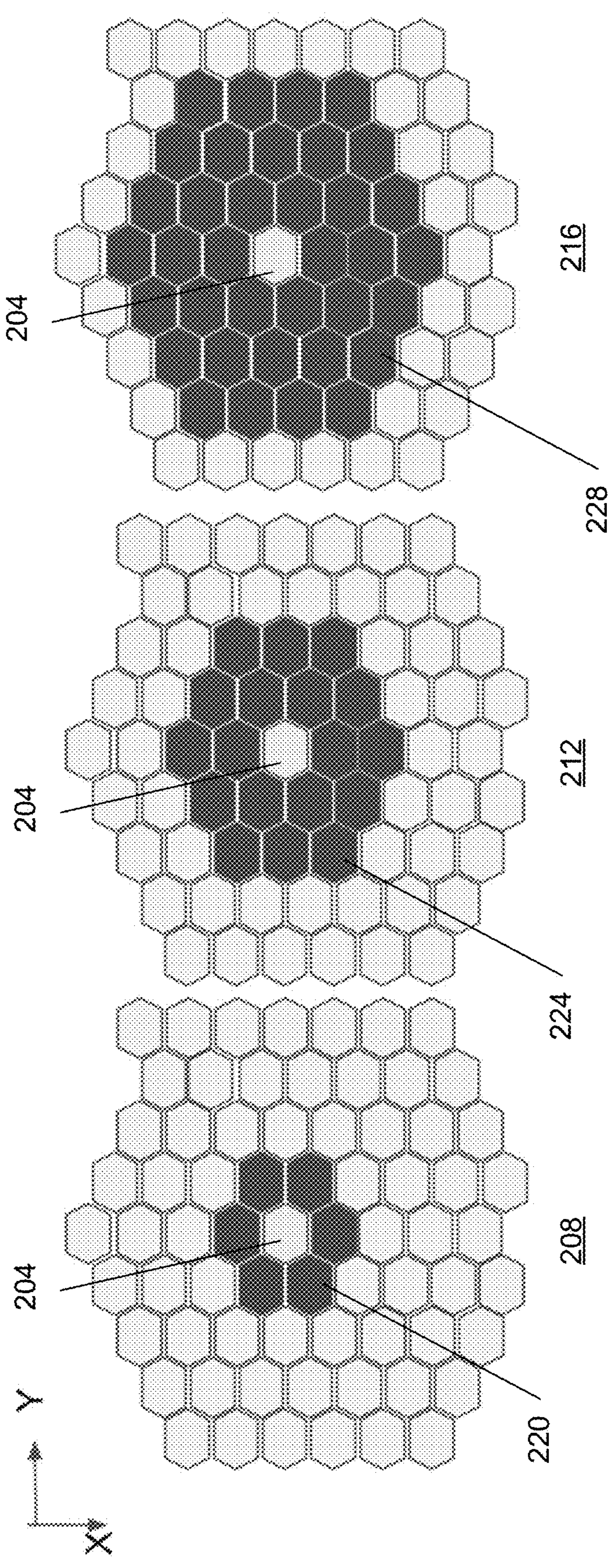
FIG. 2 illustrates neighborhoods around a partition according to embodiments of the present invention.

FIG. 2 illustrates neighborhoods around a partition. Partition 204 is shown in yellow in diagram 208, diagram 212, and diagram 216. Diagram 208 shows partitions in red (e.g., partition 220) that are a one partition away from partition 204 (i.e., 1-neighborhood). Diagram 212 shows partitions in red (e.g., partition 224) that are two partitions or less away from partition 204 (i.e., 2-neighborhood). Partition 224 is two partitions away from partition 204. Diagram 216 shows partitions in red (e.g., partition 228) that are three partitions or less away from partition 204 (i.e., 3-neighborhood). Partition 228 is three partitions away from partition 204.

Plate coordinate systems may include horizontal and vertical locations of the wells across the plate. The hexagonal tiling may be represented by natural numbered tuples (x,y). An n-neighborhood around a partition (x,y) may be described as follows. Each partition has an n-neighborhood partition above itself achieved by a translational shift upward of n hexagonal partitions. Similarly, n-neighbors below, and upper (lower) left and upper (lower) right can be defined. An n-neighborhood of hexagon (x,y) is defined as all i neighbors of (x,y) in all directions where i<=n.

If there is leakage from partition 204, the probability that the leak reaches into its n-neighborhood is inversely proportional with n. This is a result of the nature of leakage and the hexagonal tiling pattern. Leakage reaching the n-neighborhood occurs when the leakage material has flowed across at least n partition boundaries in the same direction.

Features used in machine learning models may include features based on the n-neighborhood. For example, an n-neighborhood around a partition may have k hexagonal partitions. Each of the k partitions has both a fluorescence measurement and a presumed positive or negative result from the previous classification determination. Calculations can be made on such a neighborhood, such as the standard deviation of fluorescence values across a neighborhood.

Additionally, features may be based on distributions of values for n-neighborhoods. A population of n-neighborhoods may be for a particular lane. A feature may include determining some value for each n-neighborhoods in a lane. For example, the feature may include the average fluorescence value, the number of positive partitions, and/or the number of negative partitions. A feature may include a statistical value for the n-neighborhood around a particular partition based on the distribution of all n-neighborhoods. For example, the statistical value may be a number of standard deviations (e.g., a z-score), a percentile, a separation value (a difference or ratio) from a median or mean, or a skew.

Features may also include values for the partition itself without consideration of an n-neighborhood. For example, a feature may include a value for intensity of the partition. Features may include a statistical value for intensity of the partition. For example, the statistical value may be a number of standard deviations (e.g., a z-score), a percentile, a separation value (a difference or ratio) from a median or mean, or a skew.

B. Training Data

In many cases, training data may not be updated while the instrument is in the field. As a result, when new users create new assays, the training data should already anticipate and reflect this unknown data. An accurate and extensive training data set may be used for the leakage model to generalize the model for different scenarios.

1. Lanes and Experiments

Experiments chosen for the training data covered a wide breadth. Data was chosen from several assays, including determining gene expression, absolute quantification, cell-free DNA, residual DNA testing, microbial detection, and copy number variation. Additionally, because leakage occurs rarely (less than 1% of the time), experimenters also created leakage data. Outdated versions of plates with higher leakage were used to create data. Experimenters also physically manipulated the lab preparation to induce leakage.

The image data from the experiments was preprocessed to determine positive partitions. The preprocessing may include the same procedure to determine positive partitions as described herein. For example, the images may be acquired, be organized into rows and columns, undergo artifact removal, and be segmented into different partitions. The partitions may each be assigned a fluorescence value. The data of the partitions and the fluorescence values may undergo a masking algorithm, crosstalk correction, and value normalization. The partitions may then be classified as positive or negative.

2. Labeling Data

Figure 3:
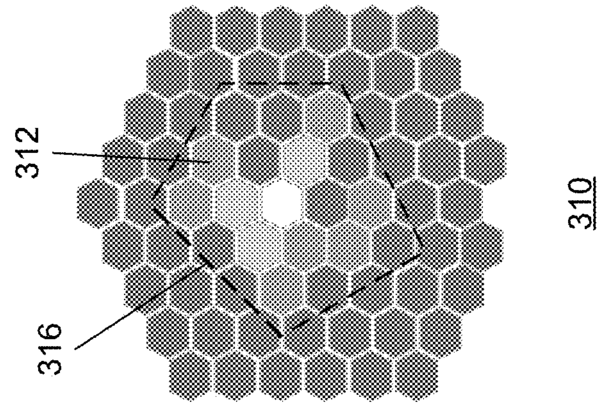
FIG. 3 shows an example of partitions not labeled as having leakage and partitions labeled for leakage according to embodiments of the present invention.
Figure 3:
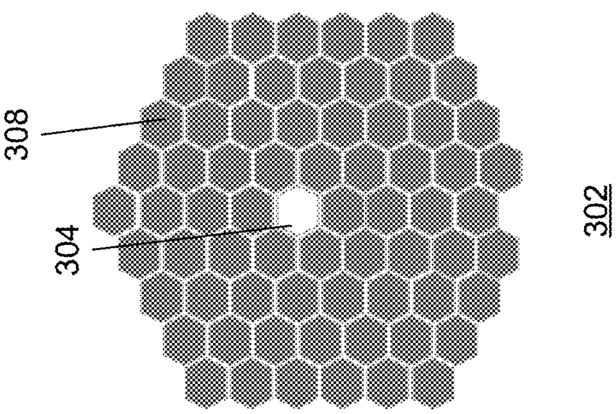

FIG. 3 shows an example of partitions not labeled as having leakage and partitions labeled for leakage. White hexagons (e.g., partition 304) indicate a positive partition. Partitions that are dark gray (e.g., partition 308) are negative for the analyte. The partitions shown in illustration 302 are not labeled for leakage. Partitions that are between the two colors (e.g., partition 312) have some fluorescence between positive and negative. When a positive partition is surrounded by partitions having these intermediate fluorescence intensities, leakage may have occurred. Illustration 310 shows partitions labeled for leakage. Digital PCR image analysts label leakage. Areas of leakage can identified by a polygon (e.g., polygon 316). The partitions within the polygons are labeled as having leakage. Several dPCR image analysts may be used to label leakage in the same image.

3. Data Leakage

Beginning with terabytes of data, the lanes were separated into training/validation data and two forms of test data. For the labeled data, six sets of lanes for 5-fold cross validation and a reserved test set were used.

Feature values across a single lane may be related because most of the feature values arise from the distribution of raw data across the lane. For example, a feature can be calculated as a constant across the entire lane rather than being a function at the partition level. Each Z score feature is calculated against a distribution across the entire lane. Including raw data from the same lane in both the training data and the test data results in data leakage. Data leakage occurs when a model both trains and tests on similar data thereby overfitting the model to such data. To mitigate this problem, entire lanes were included in either the cross validation or test sets.

4. Down Sampling

Leakage occurs less than 1% of the time. Hence, down sampling is used to properly train the binary classifier. In the absence of down sampling, any machine learning model may simply predict the majority class. If down sampling is performed before assigning lanes to the six sets for cross validation and test set, different percentages of positive and negative partitions would appear in each set. Instead, an overall down sampling rate is chosen, and a particular down sampling rate is calculated for each of the six sets to meet the overall down sampling rate.

Figure 4:
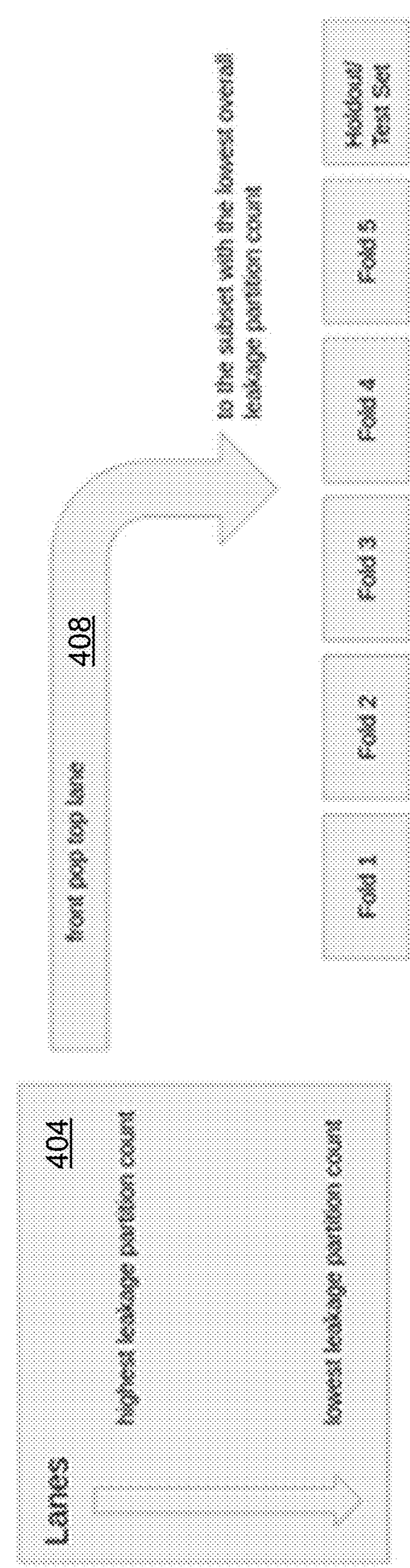
FIG. 4 illustrates a technique for splitting labeled lanes into six sets (i.e., folds) according to embodiments of the present invention.

FIG. 4 illustrates a technique for splitting labeled lanes into six sets (i.e., folds). At stage 404, the lanes are listed in decreasing order of the total number of partitions labeled as leakage. The first six lanes are placed in their own folds. Thereafter, at stage 408, the next lane is placed in the fold with the fewest partitions labeled as leakage. Iterating through all lanes, the lanes were distributed to the folds similarly. This is a mathematically and computationally optimal solution to solve the problem of having roughly equal positive partitions in each set. A single lane is assigned to a single fold and not split among different folds.

After down sampling, leakage was present in more than 5% of partitions. Partitions with leakage were weighted higher to help train the binary classifier.

5. Unlabeled Test Set

A first labeled test data is used after the model is initially trained and chosen using the training and validation sets. A threshold of the model is chosen to mitigate both false positives and false negatives The largest proportion of available lanes are unlabeled and are used as test data.

A second test data set, which is unlabeled, is used thereafter to manually assess errors from the leakage model across various lanes. The threshold of the model was fine-tuned after visually assessing 50-100 other lanes.

In addition to threshold calculation, the unlabeled test data set was used to update the training data set manually and automatically. For example, after different iterations of the model, statistics on hundreds of lanes were calculated. If substantial leakage was found, these were added to the training dataset in an iterative fashion. This resulted in catching many corner cases and adapting the model thereafter. As discussed previously, many lanes were also manually assessed with the intention of fine-tuning the model threshold. Any recurring manually assessed errors helped to benefit the model, because this added to the training data set. In all such cases, this helped iteratively decrease false positives and negatives from the model. After model validation, the model used for deployment on the actual instrument is trained on all labeled data.

C. Example Decision Tree Model

A Microsoft implementation of the LightGBM model was used. An ensemble technique with trees was chosen because leakage occurs at a low rate and so the training dataset was very biased. With an ensemble technique, one might choose either bagging or boosting. A boosting algorithm was chosen because leakage happens at a low rate, and leakage is reasonably stable.

Within these bagging methods, there are leaf-wise or level-wise growth options. These refer to different techniques of appending additional levels of a tree or weak learner. If additional levels are appended en masse, across all leaves, this method is referred to as level-wise. If instead, an additional node is added in exactly the weakest location, based on some mutual information or accuracy metric, this method is referred to as leaf-wise growth. While leaf-wise growth can be more advantageous and learns faster, it can often overfit when trained on small datasets. After effort to create a large leakage training data set, for the binary classifier, the LightGBM model was able to take advantage of leaf-wise growth.

Hyperparameters for the model were chosen to increase generalizability. The hyperparameters resulted in fewer and simpler weak learners or trees within the ensemble. Hyperparameters may include small maximum tree depth, high minimum children, low number of iterations: how many times bagging implemented, low feature fraction: proportion of features used per bagging implementation, high regularization parameters: boosting is a greedy algorithm and can overfit, small maximum bin size, histogram: Number of bins features are partitioned into, low learning rate, and early stopping.

D. Post Processing

Leakage results from liquid flowing across physical neighboring partitions. All channels of data are recorded from the same liquid. This concept was incorporated into the algorithm during the post-processing step, and pass whether each partition is predicted as leakage identically across all channels. If the algorithm predicts leakage exists in any one or more channels, leakage is resolved to exist in all channels.

If less than a threshold value of the valid partitions in a lane is predicted as leakage by the partition leakage model, then the lane remains valid. Subsequent algorithms and calculations including copies per partition may be performed without partitions predicted as leakage.

If more than or equal to a threshold value of the valid partitions in a lane is predicted as leakage by the partition leakage model, then the lane is flagged as invalid. No further subsequent algorithms may be executed using the lane.

Because of the physical cause of leakage stemming from fluid from positive partitions flowing into negative partitions, entire negative lanes cannot have leakage. The algorithm may be deactivated if either no positive partitions or no negative partitions are detected from the clustering algorithm. This deactivation is done on a channel level, and the algorithm remains active on any remaining channels with both positive and negative partitions. Similarly, the algorithm may be deactivated when exactly one partition is positive, because no leakage could have occurred.

III. Example Methods

Embodiments include methods of detecting leakage in partitions using a trained machine learning model. In addition, embodiments include methods of training the machine learning model.

A. Method of Detecting Leakage

Figure 5:
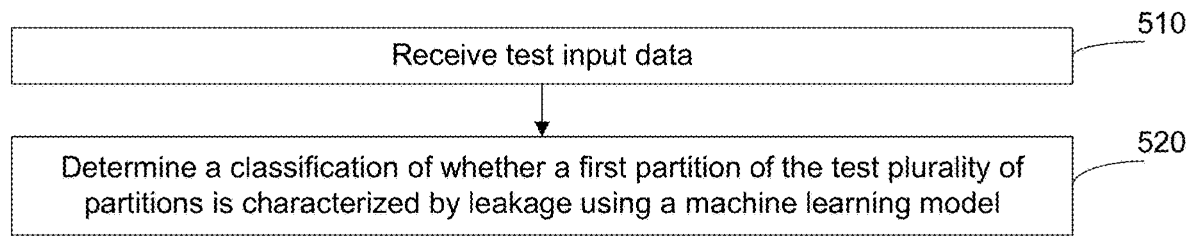
FIG. 5 is a flowchart of an example process to detect leakage according to embodiments of the present invention.

FIG. 5 is a flowchart of an example process 500. In some implementations, one or more process blocks of FIG. 5 may be performed by system 700.

At block 510, test input data may be received. The test input data may include, for each partition of the test plurality of partitions, several properties obtained from pixels of one or more images of the microfluidic device. The properties may include a location of the partition within the microfluidic device, a value of an intensity of pixels associated with the partition, and a status of an analyte being absent or present in the partition. The location of the partition may use an x, y coordinate system as described herein. The properties of the test input data may further include for each partition of the test plurality of partitions, a categorization of whether the partition is valid or invalid. For example, a partition may be invalidated as part of a masking algorithm, artifact removal, or other error corrections as described.

The intensity of the pixels may be a fluorescence intensity. The properties may include a value for each intensity of a plurality of intensities associated with the partition, and the plurality of intensities may include intensities of different fluorescence channels. The different fluorescence channels may be tailored to detect different fluorescent dyes. The number of different fluorescence channels and the number of the plurality of intensities may be from 2 to 10.

Each partition of the test plurality of partitions may be hexagonal. The hexagons may be regular hexagons. In some embodiments, the partitions may be elliptical (circular or oval), rectangular, square, triangular, or pentagonal. The test plurality of partitions may include at least 1,000 partitions, 5,000 partitions, 10,000 partitions, 20,000 partitions, including at least 30,000 partitions, 50,000 partitions, 80,000 partitions, and 100,000 partitions. The microfluidic device may be a digital PCR plate, and the partitions may be wells in the digital PCR plate. The digital PCR plate may be a polymer, including cyclic olefin copolymer (COC) or cyclic olefin polymer (COP). The plate may be any plate described herein. As an example, the microfluidic device may be a microfluidic device described in US 2020/0306753 A1, filed Mar. 27, 2020, the entire contents of which are incorporated herein by reference for all purposes. The test plurality may include all partitions or all valid partitions of a dPCR plate. In some embodiments, the test plurality may be all partitions or all valid partitions in a lane of a dPCR plate. For example, the test plurality may then be one-eighth of all partitions on the plate when there are eight lanes. In some embodiments, the test plurality may be all partitions or all valid partitions in one image from a lane. For example, the test plurality may then be one-eighth of all partitions in a lane when eight images are acquired for a lane.

In some embodiments, process 500 may further include for each partition of the test plurality of partitions, determining the status of the analyte using the value of the intensity of the pixels associated with the partition. The analyte may be a nucleic acid molecule, including DNA, RNA, and any other nucleic acid molecule described herein. The analyte may include specific types of the analyte. For example, the analyte may include a nucleic acid molecule from one haplotype and a nucleic acid molecule from the other haplotype. The status of the analyte in the partition may be determined through comparing the intensity (total, mean, median, mode, or percentile) intensity with a threshold value. When the intensity is higher than the threshold value, the status may be determined to be positive (present). When the intensity is lower than the threshold value, the status may be determined to be negative (absent). In some embodiments, two different threshold values are used to determine positive and negative statuses, and an indeterminate status is assigned to intensity values between the two threshold values.

In some embodiments, process 500 may include performing an assay to detect the analyte in the test plurality of partitions using the microfluidic device. The assay may be a digital PCR assay. Performing the assay may include obtaining the biological sample. The biological sample may be mixed with reagents and primers. The mixed biological sample may be added to the microfluidic device. The analyte may be amplified over several cycles in the partitions. In embodiments, process 500 may include acquiring the one or more images of the microfluidic device. An image may be acquired for each color channel.

At block 520, a classification of whether a first partition of the test plurality of partitions is characterized by leakage may be determined using a machine learning model. The machine learning model uses the test input data to determine the classification. The machine learning model may be trained by receiving training input data. The training input data may be obtained from pixels of images of a plurality of training microfluidic devices. Each training microfluidic device may have a first plurality of partitions. The training input data may include for each partition, the same properties as the test input data. The training input data may include first labels indicating a known classification of whether a partition is characterized by leakage for each partition in the first plurality of partitions. The machine learning model may be trained by optimizing, using the training input data, parameters of the machine learning model based on outputs of the machine learning model matching or not matching corresponding labels of the first labels when the machine learning model is executed using the training input data. An output of the machine learning model may specify whether a partition is characterized by leakage. The classification of the first partition may be based on a cutoff value to target a desired accuracy (e.g., sensitivity and/or specificity). The machine learning model may be trained as described herein (e.g., FIG. 6).

The machine learning model may use different features to determine the classification of leakage. The machine learning model may receive values for these features, or the machine learning model may calculate the values for the features. The machine learning model may use a statistical value of the statuses of partitions within a threshold distance away from the first partition. For example, the statistical value may be of the statuses of partitions in an n-neighborhood as described herein. The n-neighborhood may include n as 1, 2, 3, 4, 5, 6, 7, 8, 9, 10, and/or 11. In some embodiments, the statistical value may be of the partitions within the n-neighborhood (e.g., mean, median, mode, variance). In some embodiments, the statistical value may be a comparison of the particular n-neighborhood with the first partition at the center to the overall distribution of n-neighborhoods. For example, the statistical value may be a number of standard deviations (e.g., a z-score) a percentile. The variance, percentile, or standard deviation may be relative to a mean value, median value, and/or other statistical value for a lane, a device, or a previously tested reference lane or device. The status may be positive, negative, or a combination of positive and negative for the analyte. In some embodiments, the statistical value is of the statuses of partitions along a common axis. For example, the statistical value may be along a line of partitions intersecting the first partition. For a hexagonal partition, the line may be at an angle of 30 degrees, 90 degrees, or 150 degrees relative to the longitudinal axis of the microfluidic device. The machine learning model may use a value representing the intensity of pixels in multiple partitions of the test plurality of partitions.

Other features used by the machine learning model may include the value of the intensity of the pixels associated with the partition or the value of the intensity of pixels associated with an n-neighborhood or a line including the partition. The features may include values limited to only partitions called positive or partitions called negative. In some embodiments, the features may include values for partitions called either positive or negative.

The value may be a statistical value (e.g., mean, median, mode, percentile, maximum, minimum). The value may be normalized. Features may include the number of positive partitions, the number of negative partitions, or a statistical value thereof in an n-neighborhood. The value may also be a sum or count of intensities or partitions having a certain characteristic. In some embodiments, an amount of partitions (e.g., count or area) may be used.

Some features may be calculated for a single partition or multiple partitions (e.g., n-neighborhood or line). Some features may be calculated for a lane, a channel, or the entire microfluidic device. For example, a feature may include a value that quantifies the average intensity of partitions not called positive across an entire lane (e.g., a rain value). Any, all, and any combination of features may be used by the machine learning model.

A feature may be a combination of one or more of the following categories:

Location of partitions: n-neighborhood, common axis, lane, entire microfluidic device, or any combination thereof;

Image parameters: Particular channel or channels;

Partitions considered: Positive for analyte, negative for analyte, or either;

Value: Intensity (raw or normalized), amount of partitions; and/or

Calculated value: mean, median, mode, percentile, maximum, minimum, skew, variance, standard deviation, or z-score.

For example, a feature may include partitions within a neighborhood of 10, along a line of 30 degrees relative to the longitudinal axis of the device, for all fluorescence channels, and may be the median normalized intensity of all partitions called negative for the analyte. In embodiments, the machine learning model may use 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, or more features.

The machine learning model may be a decision tree learning model as described herein. The machine learning model may include a supervised, unsupervised, or semi-supervised learning model. Models may include different approaches and algorithms including analytical learning, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, Nearest Neighbor Algorithm, probably approximately correct learning (PAC) learning, ripple down rules, a knowledge acquisition methodology, symbolic machine learning algorithms, subsymbolic machine learning algorithms, support vector machines, Minimum Complexity Machines (MCM), random forests, ensembles of classifiers, ordinal classification, data pre-processing, handling imbalanced datasets, statistical relational learning, or Proaftn, a multicriteria classification algorithm The model may include linear regression, logistic regression, deep recurrent neural network (e.g., long short term memory, LSTM), Bayes classifier, hidden Markov model (HMM), linear discriminant analysis (LDA), k-means clustering, density-based spatial clustering of applications with noise (DBSCAN), random forest algorithm, support vector machine (SVM), or any model described herein.

The model may include a convolutional neural network (CNN). The CNN may include a set of convolutional filters configured to filter the input data. The number of filters for each layer may be from 10 to 20, 20 to 30, 30 to 40, 40 to 50, 50 to 60, 60 to 70, 70 to 80, 80 to 90, 90 to 100, 100 to 150, 150 to 200, or more. The kernel size for the filters can be 2, 3, 4, 5, 6, 7, 8, 9, 10, 11, 12, 13, 14, 15, from 15 to 20, from 20 to 30, from 30 to 40, or more. The CNN may include an input layer configured to receive the input data. The CNN may also include a plurality of hidden layers including a plurality of nodes. The first layer of the plurality of hidden layers coupled to the input layer. The CNN may further include an output layer coupled to a last layer of the plurality of hidden layers and configured to output the output data. The neural network may determine the features used in the machine learning model.

Determining the classification may include determining the first partition is characterized by leakage using a first intensity of the plurality of intensities corresponding to fluorescence channels. Upon determining the first partition is characterized by leakage in the first intensity of the plurality of intensities, the process may include determining the first partition is characterized by leakage in all other intensities in the plurality of intensities.

Process 500 may include determining the classification is that the first partition characterized by leakage. In some embodiments, process 500 further may further include determining a classification of whether a copy number variation exists in a subject from a plurality of statuses from a subset of the test plurality of partitions not including the first partition, when the first partition is characterized by leakage. In some embodiments, process 500 may include treating the subject for a disorder (e.g., cancer) related to the copy number variation. Treatments may include chemotherapy, radiation, drugs, genetic therapy, or surgery.

The classification may be a first classification. The process may further include determining a plurality of second classifications for each partition of the test plurality of partitions other than the first partition. The process may further include determining an amount of partitions of the test plurality of partitions having the first classification or the second classification indicating leakage. The process may include comparing the amount to a threshold value. The threshold value may be 1%, 2%, 3%, 4%, 5%, 6%, 7%, 8%, 9%, or 10% of the partitions in a lane or the entire microfluidic device. The process may further include outputting that the test plurality of partitions is not suitable for further analysis based on the comparison.

In some embodiments, methods may include detecting leakage in a plurality of microfluidic devices. The plurality of microfluidic devices may include 2 to 10, 10 to 50, 50 to 100, 100 to 1,000, 1,000 to 5,000, 5,000 to 10,000, or more microfluidic devices. The method may determine classifications for partitions in the plurality of microfluidic devices in 10 minutes, 10 to 60 minutes, 1 hour to 10 hours, or 10 hours to 24 hours.

Process 500 may include additional implementations, such as any single implementation or any combination of implementations described and/or in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

B. Method of Training Model

Figure 6:
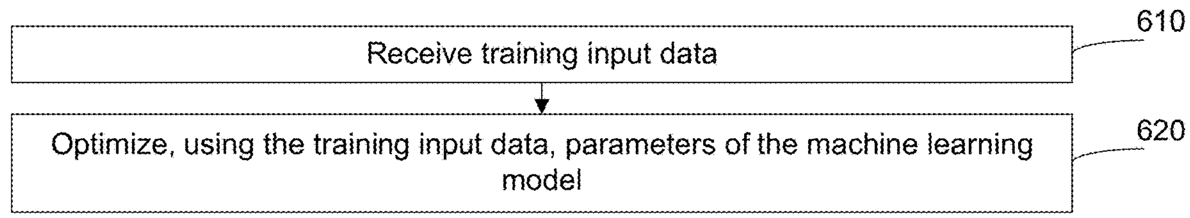
FIG. 6 is a flowchart of an example process to train a model to detect leakage according to embodiments of the present invention.

FIG. 6 is a flowchart of an example process 600. In some implementations, one or more process blocks of FIG. 6 may be performed by system 700. Process 600 may be the process used to train the machine learning model in process 500.

At block 610, training input data may be received. The training input data may be obtained from pixels of images of a plurality of training microfluidic devices. Each training microfluidic device may have a first plurality of partitions. The training input data may include for each partition, a location of the partition within each training microfluidic device, a value of an intensity of pixels associated with the partition, and a status of an analyte being absent or present in the partition. In addition, the training input data may include first labels indicating a known classification of whether a partition is characterized by leakage for each partition in the first plurality of partitions. The plurality of training microfluidic devices may include 100 or more microfluidic devices. The training input data may be a least 1 gigabyte, 100 gigabytes, 500 gigabytes, or 1 terabyte of data.

At block 620, parameters of the machine learning model may be optimized using the training input data. Parameters of the machine learning model may be optimized based on outputs of the machine learning model matching or not matching corresponding labels of the first labels when the machine learning model is executed using the training input data. An output of the machine learning model may specify whether a partition is characterized by leakage.

The training input data may be obtained from images of a plurality of first training samples. The plurality of first training samples may include subsets of the plurality of first training samples. Each subset may include a total number of partitions having the first label indicating a known classification of an existence of leakage within 10% of the total number of partitions in the other subsets. Optimizing the parameters may include determining the parameters using one subset and validating the parameters on another subset. For example, optimizing the parameters may include using 5-fold cross validation as described herein. Each training microfluidic device may include a lane of partitions. All partitions in each lane may be in a single subset of the plurality of first training samples.

Process 600 may include additional implementations, such as any single implementation or any combination of implementations described and/or in connection with one or more other processes described elsewhere herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

IV. Example Systems

Figure 7:
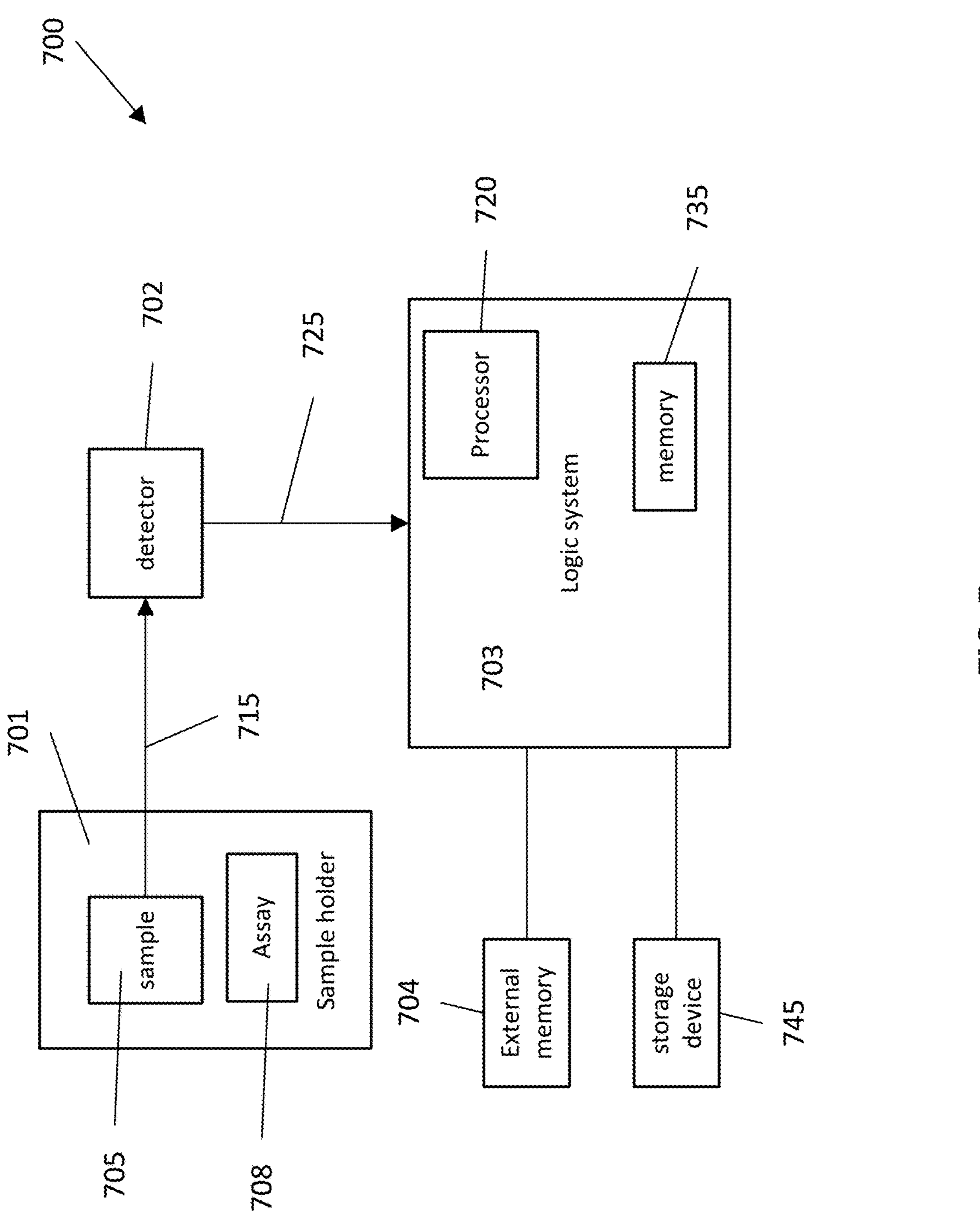
FIG. 7 illustrates a measurement system according to embodiments of the present invention.

FIG. 7 illustrates a measurement system 700 according to an embodiment of the present invention. The system as shown includes a sample 705, such as DNA molecules within a sample holder 710, where sample 705 can be contacted with an assay 708 to provide a signal of a physical characteristic 715. An example of a sample holder can be a dPCR well plate that includes primers of an assay. Physical characteristic 715 (e.g., a fluorescence intensity, a voltage, or a current), from the sample is detected by detector 702. Detector 702 can take a measurement at intervals (e.g., periodic intervals) to obtain data points that make up a data signal. In one embodiment, an analog-to-digital converter converts an analog signal from the detector into digital form at a plurality of times. Detector 702 may be an imaging device. Sample holder 701 and detector 702 can form an assay device, e.g., a dPCR system according to embodiments described herein. A data signal 725 is sent from detector 702 to logic system 703. Data signal 725 may be stored in a local memory 735, an external memory 704, or a storage device 745.

Logic system 703 may be, or may include, a computer system, ASIC, microprocessor, etc. It may also include or be coupled with a display (e.g., monitor, LED display, etc.) and a user input device (e.g., mouse, keyboard, buttons, etc.). Logic system 703 and the other components may be part of a stand-alone or network connected computer system, or they may be directly attached to or incorporated in a device (e.g., a sequencing device) that includes detector 702 and/or sample holder 701. Logic system 703 may also include software that executes in a processor 720. Logic system 703 may include a computer readable medium storing instructions for controlling system 700 to perform any of the methods described herein. For example, logic system 703 can provide commands to a system that includes sample holder 701 such that sequencing or other physical operations are performed. Such physical operations can be performed in a particular order, e.g., with reagents being added and removed in a particular order. Such physical operations may be performed by a robotics system, e.g., including a robotic arm, as may be used to obtain a sample and perform an assay.

Figure 8:
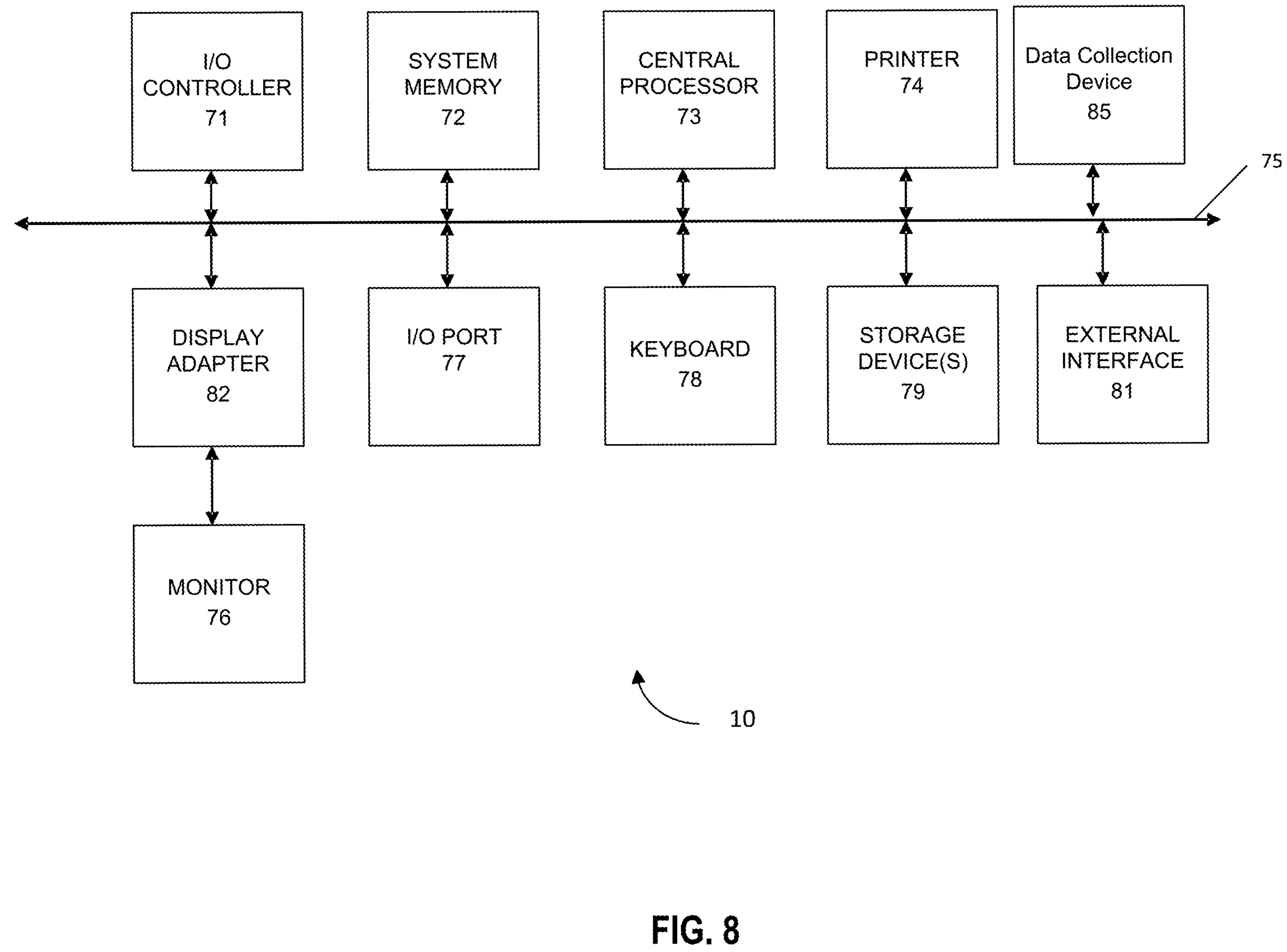
FIG. 8 shows a block diagram of an example computer system usable with systems and methods according to embodiments of the present invention.

Any of the computer systems mentioned herein may utilize any suitable number of subsystems. Examples of such subsystems are shown in FIG. 8 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones, other mobile devices, and cloud-based systems.

The subsystems shown in FIG. 125 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, Thunderbolt, Lightning). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g., an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an", or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A method of detecting leakage in a microfluidic device, the microfluidic device having a test plurality of partitions, wherein each partition of the test plurality of partitions is hexagonal, the method comprising:

receiving test input data, the test input data includes, for each partition of the test plurality of partitions, the following properties obtained from pixels of one or more images of the microfluidic device:

a location of the partition within the microfluidic device, a value of an intensity of pixels associated with the partition, and a status of an analyte being absent or present in the partition; and determining a classification of whether a first partition of the test plurality of partitions is characterized by leakage using a machine learning model, wherein the machine learning model uses the test input data and is trained by:

receiving training input data, the training input data obtained from pixels of images of a plurality of training microfluidic devices, each training microfluidic device having a first plurality of partitions, the training input data including for each partition:

the same properties as the test input data, and first labels indicating a known classification of whether a partition is characterized by leakage for each partition in the first plurality of partitions, and optimizing, using the training input data, parameters of the machine learning model based on outputs of the machine learning model matching or not matching corresponding labels of the first labels when the machine learning model is executed using the training input data, wherein an output of the machine learning model specifies whether a partition is characterized by leakage; and wherein the machine learning model uses a statistical value of the statuses of partitions within a threshold distance away from the first partition.

2. The method of claim 1, wherein the statistical value is of the statuses of partitions along a common axis.

3. The method of claim 1, wherein the machine learning model uses a value representing intensity of pixels in multiple partitions of the test plurality of partitions.

4. The method of claim 1, wherein the properties of the test input data further include for each partition of the test plurality of partitions, a categorization of whether the partition is valid or invalid.

5. The method of claim 1, wherein the microfluidic device is a digital PCR plate.

6. The method of claim 1, wherein the test plurality of partitions comprises 20,000 partitions.

7. The method of claim 1, wherein the machine learning model is a decision tree learning model.

8. The method of claim 1, wherein the intensity of the pixels is a fluorescence intensity.

9. The method of claim 1, wherein:

the properties include a value for each intensity of a plurality of intensities associated with the partition, and the plurality of intensities comprises intensities of different fluorescence channels.

10. The method of claim 9, wherein determining the classification comprises determining the first partition is characterized by leakage using a first intensity of the plurality of intensities, and upon determining the first partition is characterized by leakage in the first intensity of the plurality of intensities, determining the first partition is characterized by leakage in all other intensities in the plurality of intensities.

11. The method of claim 1, further comprising:

for each partition of the test plurality of partitions, determining the status of the analyte using the value of the intensity of the pixels associated with the partition.

12. The method of claim 1, further comprising determining the classification is that the first partition is characterized by leakage.

13. The method of claim 12, further comprising:

determining a classification of whether a copy number variation exists in a subject from a plurality of statuses from a subset of the test plurality of partitions not including the first partition.

14. The method of claim 1, wherein the classification is a first classification, the method further comprising:

determining a plurality of second classifications for each partition of the test plurality of partitions other than the first partition.

15. The method of claim 14, further comprising:

determining an amount of partitions of the test plurality of partitions having the first classification or the second classification indicating leakage, comparing the amount to a threshold value, and outputting that the test plurality of partitions is not suitable for further analysis based on the comparison.

16. The method of claim 1, further comprising acquiring the one or more images of the microfluidic device.

17. The method of claim 1, further comprising performing an assay to detect the analyte in the test plurality of partitions using the microfluidic device.

18. A method of training a machine learning model for detecting leakage in a microfluidic device, the method comprising:

receiving training input data, the training input data obtained from pixels of images of a plurality of training microfluidic devices, each training microfluidic device having a first plurality of partitions, wherein each partition of the first plurality of partitions is hexagonal, the training input data including for each partition:

a location of the partition within each training microfluidic device, a value of an intensity of pixels associated with the partition, a status of an analyte being absent or present in the partition, and first labels indicating a known classification of whether a partition is characterized by leakage for each partition in the first plurality of partitions; and optimizing, using the training input data, parameters of the machine learning model based on outputs of the machine learning model matching or not matching corresponding labels of the first labels when the machine learning model is executed using the training input data, wherein an output of the machine learning model specifies whether a partition is characterized by leakage; and wherein the machine learning model uses a statistical value of the statuses of partitions within a threshold distance away from the first partition.

* * * * *